United States Patent [19]
Matsubara

[11] Patent Number: 6,016,521
[45] Date of Patent: Jan. 18, 2000

[54] COMMUNICATION CONTROL DEVICE

[75] Inventor: Kimikatsu Matsubara, Hyogo, Japan

[73] Assignees: Mitsubishi Electric Semiconductor Systems Corporation; Mitsubishi Denki Kabushiki Kaisha, both of Tokyo, Japan

[21] Appl. No.: 09/056,648

[22] Filed: Apr. 8, 1998

[30]     Foreign Application Priority Data

Dec. 1, 1997   [JP]   Japan ................................. 9-330624

[51] Int. Cl.⁷ .................................................. G06F 13/00
[52] U.S. Cl. ........................... 710/34; 710/52; 709/250; 712/38; 372/16; 372/44
[58] Field of Search ....................... 709/250; 710/29–35, 710/52–74, 126; 711/127–131; 712/35–40; 370/462, 85.2; 377/15–16, 44

[56]               References Cited

U.S. PATENT DOCUMENTS

| | | | |
|---|---|---|---|
| 4,849,202 | 7/1989 | Knapp et al. | 710/126 |
| 5,383,230 | 1/1995 | Fuse et al. | 377/44 |
| 5,483,553 | 1/1996 | Shigetome et al. | 375/256 |
| 5,535,211 | 7/1996 | Yano | 370/85.2 |
| 5,566,343 | 10/1996 | Nishiguchi | 712/1 |
| 5,631,905 | 5/1997 | Yano | 370/462 |
| 5,636,343 | 6/1997 | Asano et al. | 712/38 |
| 5,666,559 | 9/1997 | Wisor et al. | 710/32 |
| 5,724,399 | 3/1998 | Imakura | 377/16 |
| 5,752,073 | 5/1998 | Gray, III et al. | 712/35 |
| 5,765,019 | 6/1998 | Asano | 712/38 |
| 5,918,073 | 6/1999 | Hewitt | 710/52 |

FOREIGN PATENT DOCUMENTS

| | | |
|---|---|---|
| 4-175937 | 6/1992 | Japan . |
| 4-205512 | 7/1992 | Japan . |
| 5-80089 | 3/1993 | Japan . |

*Primary Examiner*—Christopher B. Shin
*Attorney, Agent, or Firm*—Burns, Doane, Swecker & Mathis, LLP

[57]               ABSTRACT

A communication control device has a central processing unit (3), an input data buffer (14), an output data buffer (15), a readout reload register (17), an output reload register (18), and a timer (19) located between an input terminal (1) and an output terminal (2). The timer (19) reads count values stored in both the reload registers (17, 18) alternately, that have already been set by the central processing unit (3) according to a protocol to be processed, and performs a counting operation based on the count values. Communication data items stored in both the data buffers (14, 15) are latched based on a time out output from the timer (19).

20 Claims, 5 Drawing Sheets

COMMUNICATION CONTROL DEVICE

BACKGROUND OF THE INVENTION

1. Field of the Invention

The present invention relates to a communication control device that may be applied to multiplex communication networks such as a Local Area Network (LAN) and the like and, more particularly, to a communication control device that may be widely, generally used for multiplex communication networks such as a LAN and the like.

2. Description of the Prior Art

In this type of conventional communication control devices, various control functions required for data communication, for example, a timing control function to transmit and receive communication data, a collision control function to control a collision that happens when two or more data items are output on a network channel simultaneously, and other functions are realized or made up of hardware devices. In those conventional devices, a computer connected to this network is so formed that the computer inputs communication data from external devices and outputs communication data to the external devices. However, in recent years, technique of this communication network field has been increasingly diversified, so that a plurality of protocols are designed, provided, and used widely. It is thereby difficult to apply a communication control device to other communication devices using different other protocols if this communication control device is formed by hardware and the function of one protocol is also realized by the hardware. Conventionally, it must be therefore required to design and make a communication control device for each protocol. In order to avoid this conventional drawback, it is required to form a communication control device in which one function is realized by using a small-sized hardware as small as possible and other functions are formed by using software.

Figure 5:
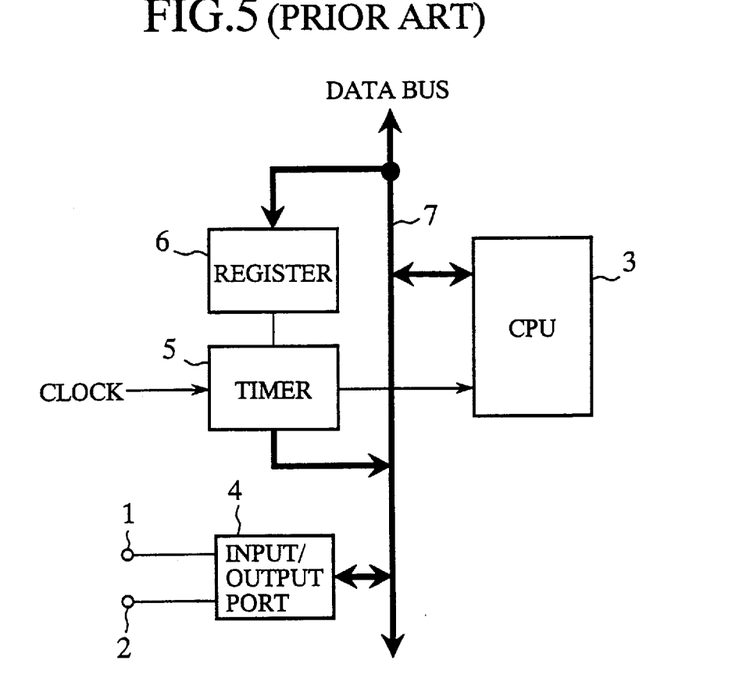
FIG. 5 is a block diagram showing a configuration of a conventional communication control device that is formed based on the minimum hardware size, in which a CPU controls various kinds of communication controls.

FIG. 5 is a diagram showing a configuration of a conventional communication control device formed based on the above conventional concept. In FIG. 5, the reference number 1 designates an input terminal, connected to communication channels (omitted from FIG. 5), through which communication data items are received, and the reference number 2 indicates an output terminal, connected to the communication channels by using wired OR logic or wired AND logic, through which communication data items are output to outside devices. The reference number 3 denotes a central processing unit (CPU), connected to both the input terminal 1 and the output terminal 2 through a data bus 7, for receiving, processing, and transferring the communication data items. The reference number 4 indicates an input/output port for temporarily storing communication data items transferred through the input terminal I and written by the CPU 3. The reference number 5 designates a timer for counting a clock signal and then for generating and transferring an interrupt signal to the CPU 3 when the timer outputs a time out. The reference number 6 designates a register into which a count value of the timer 5 is set by the CPU 3, and the reference number 7 denotes the data bus group including a plurality of buses through which the CPU 3 is connected to the register 6 and other devices.

Next, a description will be give of the operation of the conventional communication control device shown in FIG. 5.

Figure 6:
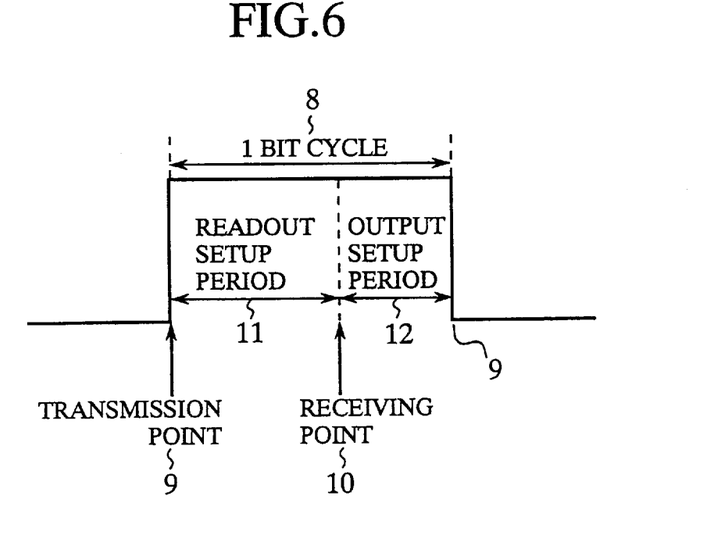
FIG. 6 is a conceptional diagram of one-bit wave form used in a LAN communication in which data communication is performed continuously based on the non return to zero (NRZ) method.

FIG. 6 is a conceptional diagram of an one-bit wave form used in a LAN communication in which data communication is performed continuously based on the non return to zero (NRZ) method. The conceptional diagram shown in FIG. 6 shows a wave form of a state in which a bit is risen. In FIG. 6, the reference number B designates one bit cycle assigned to one bit, the reference number 9 denotes a transmission point that is a starting edge of one bit, and the reference number 10 indicates a receiving point showing the timing to latch this bit data. The reference number 11 designates a readout setup period having a time length from the transmission point 9 to the receiving point 10, and the reference number 12 denotes an output setup point having a time length from the receiving point 10 to a following transmission point 9 for a following one bit.

Figure 7:
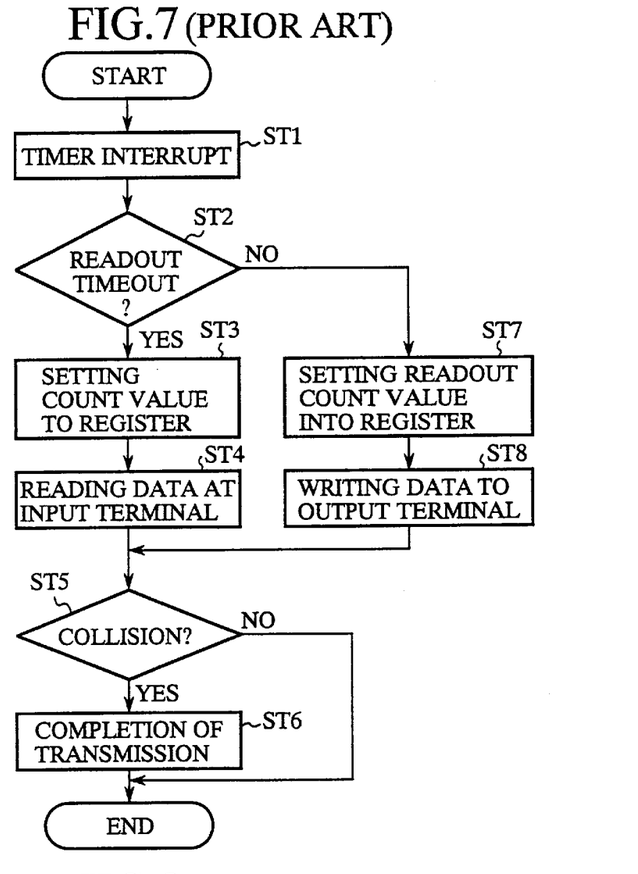
FIG. 7 is a flow chart of data transmission and receiving control executed by the conventional communication control device shown in FIG. 5.
Figure 8:
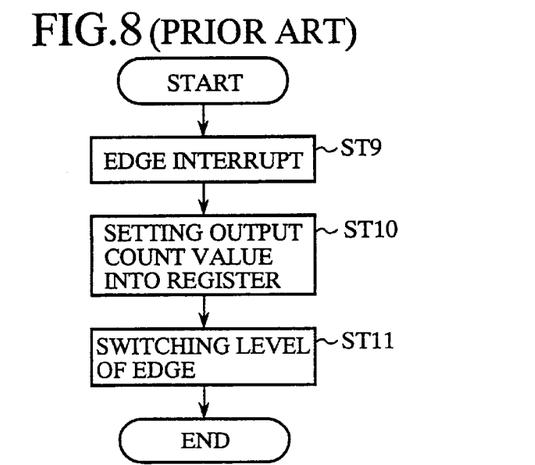
FIG. 8 is a flow chart of a data transmission and receiving control executed by the conventional communication control device shown in FIG. 5.

In the conventional communication device having the configuration in which the CPU 3 performs various kinds of communication control operations, for example, communication data items are transmitted and received in synchronism with other communication control devices (that is, in synchronism with other communication nodes) according to operation flows as shown in FIGS. 7 and 8.

FIG. 7 is a flow chart of data transmission and receiving control executed by the CPU 3 in order to perform data transmission and receiving operations. In the flow chart shown in FIG. 7, the step ST1 is a timeout waiting step. This step ST1 waits to receive an interrupt signal to be transferred from the timer 5. The step ST2 is an interrupt detection step. In this step ST2, it is detected whether or not this interrupt signal obtained at the step ST1 is an interrupt signal based on a counter value for setting the readout setup period 11. The step ST3 is an output count setting step. This step ST3 is executed only when the interrupt signal obtained by the step ST1 is the interrupt signal based on the counter value to set the readout setup period 11, and the count value to be used for the output setup period 12 is set to the register 6. The step ST4 is a communication data readout step. In this step ST4 to be executed following after the step ST3, the input communication data transferred to the input terminal 1 is read into the communication control device through the input/output port 4. The step ST5 is a collision detection step. In this step ST5, it is checked whether or not the communication data obtained in the step ST4 is equal to the communication data output on the output terminal 2. The step ST6 is a communication stop step. This step ST6 stops the data communication when the comparison result of the step ST5 indicates that both communication data items are different to each other.

The step ST7 is a step to be executed based on the operation result of the step ST2, that is, the step ST7 is executed only when the interrupt signal is obtained based on the count value during the output setup period 12. Further, in the step ST7, the count value for the readout setup period 11 is set into the register 6. The step ST8 is an output terminal writing step, to be executed following the step ST7, in which a communication data item is output to outside devices (not shown) through the output terminal 2 when there is the communication data item. After the completion of the execution of the step ST8, the step ST5 is executed. Specifically, the count value to be set into the register 6 in both the step ST3 and the step ST7 is the value including the interrupt time length from the interrupt generation timing generated by the timer 5 to the timing when the counting by the timer 5 is initiated based on the count value set into the register 6.

FIG. 8 is a flow chart of a data transmission and receiving control executed to compensate the synchronization by the CPU 3 in the conventional communication control device shown in FIG. 5. In FIG. 8, the step ST9 is an edge waiting step in which the edge of the input communication data is detected. The step ST10 is a timing compensation step in which the output count value is set into the register 6. The step ST11 is an edge switching step in which the level of the edge (namely, a rising edge and a falling edge) of the one bit wave form shown in FIG. 6 to be detected is switched.

In the conventional communication control device having such configuration and the function described above, it is possible to set the readout count value and the output count value into the register 6 during the one bit cycle shown in FIG. 6. It is thereby possible to transmit and receive the communication data during the one bit cycle. When both its own communication control device and other communication control device output communication data simultaneously, and when the input communication data and the output communication data are not agreed based on the detection of the wired OR logic or the wired AND logic in its own communication control device, it is possible to halt to output the communication data. On the other hand, when both communication data are agreed to each other, its own communication control device may continue the output of the communication data. Furthermore, because the count value is reset in the conventional communication control device after the edge of the communication data transmitted from the other communication control device is detected, it is possible to keep the operation in synchronization with the operation of other communication control devices (not shown). This causes to provide a stable data communication during a long time period. In addition, it is possible for the conventional communication control device to match various kinds of readout timings and various data communication speeds by changing the ratio between the readout count value and the output count value stored in the register 6.

However, when the communication control device is formed by the minimum size of hardware, for example, the conventional communication control device described above in which the CPU 3 controls various kinds of communication controls, it must be required for the CPU 3 to control all of various kinds of control operations to be required for the data communication. This causes to limit the speed of the data communication by the throughput or the processing ability of the CPU 3. Thus, it is difficult to increase the data communication speed in the conventional communication control device having the above configuration.

Furthermore, when the various kinds of timings of the data communication are controlled based on the interrupt processes described above, it is often happen to shift the synchronization to other communication control devices because there causes a timing lag of several $\mu$ seconds between the timing when the interrupt request is generated and the timing when the interrupt routine is initiated. In order to avoid the drawback, designers must design the communication control devices while considering the above timing lag and it thereby is difficult to apply the above configuration to communication control devices having protocols for high speed data communication.

SUMMARY OF THE INVENTION

Accordingly, an object of the present invention is, with due consideration to the drawbacks of the conventional communication control device, to provide a communication control device capable of being applicable to the field of high speed data communication networks without any decreasing of the general applicability as the communication control device.

In accordance with a preferred embodiment of the present invention, a communication control device comprises an input terminal connected to communication channels for inputting communication data on said communication channels, an output terminal connected to said communication channels through a wired OR logic or a wired AND logic and for outputting communication data to said communication channels, a central processing unit for receiving said communication data from said input terminal and for generating said communication data to be transferred to said output terminal, an output buffer for storing said communication data written by the central processing unit and for outputting said communication data to said communication channels through said output buffer, an input buffer for storing said communication data on said communication channels through said input terminal and said communication data stored by said input buffer being read by said central processing unit, a readout reload register to which a readout count value is set by said central processing unit, an output reload register to which an output count value is set by said central processing unit, and a timer for reading said count values stored in both said readout reload register and said output reload register alternately every an occurrence of a time out, and for counting each of said readout count value and said output count value. In the communication control device described above, when said time out is happen based on said readout count values, said input data buffer stored said communication data, and when said time out is happen based on said output count values, said output data buffer outputs said communication data.

The communication control device as another preferred embodiment of the present invention, further comprises an edge detection circuit, located between said input terminal and said timer, for detecting an edge of said communication data transferred through said input terminal and for outputting an edge detection signal to said timer, wherein said timer reloads said readout count value from said readout reload register when inputting said edge detection signal from said edge detection circuit during readout counting operation to count a count value based on said readout count value, and said timer outputs a time out and reloads said readout count value from said readout reload register when inputting said edge detection signal from said edge detection circuit during output counting operation to count a count value based on said output count value.

In the communication control device as another preferred embodiment of the present invention, at least one of said output data buffer and said input data buffer stores a plurality of said communication data items and outputs said plurality of communication data items in order based on a first-in first-out method.

The communication control device as another preferred embodiment of the present invention, further comprises a collision detection circuit for comparing said communication data from said input terminal with said communication data to be output through said output terminal, and for generating and outputting a collision detection signal to said central processing unit when both said communication data are not equal to each other, and wherein said central processing unit stops to output said communication data through said output terminal when receiving said collision detection signal from said collision detection circuit.

In the communication control device as another preferred embodiment of the present invention, said collision detection circuit comprises an exclusive OR circuit for comparing said communication data from said input terminal with said communication data to be output through said output terminal and for generating and outputting a control signal of a high voltage level when both said communication data are not equal to each other in voltage level, and a collision detection D flip flop for generating and outputting said collision detection signal to said central processing unit when receiving said control signal of a high voltage level from said exclusive OR circuit and when receiving a latch signal transferred to said input data buffer from said timer.

In the communication control device as another preferred embodiment of the present invention, said output data buffer comprises an output data register for storing said communication data written by said central processing unit, and an output D flip flop for storing said communication data output from said output data register based on a latch signal provided from said timer.

In the communication control device as another preferred embodiment of the present invention, said input data buffer comprises an input D flip flop for storing said communication data obtained through said input terminal based on a latch signal provided from said timer, and an input data register for storing said communication data output from said input D flip flop.

BRIEF DESCRIPTION OF THE DRAWINGS

These and other objects, features, aspects and advantages of the present invention will become more apparent from the following detailed description of the present invention when taken in conjunction with the accompanying drawings, in which.

DESCRIPTION OF THE PREFERRED EMBODIMENTS

Other features of this invention will become apparent through the following description of preferred embodiments which are given for illustration of the invention and are not intended to be limiting thereof.

Preferred embodiments of the communication control device according to the present invention will now be described with reference to the drawings.

First Embodiment

Figure 1:
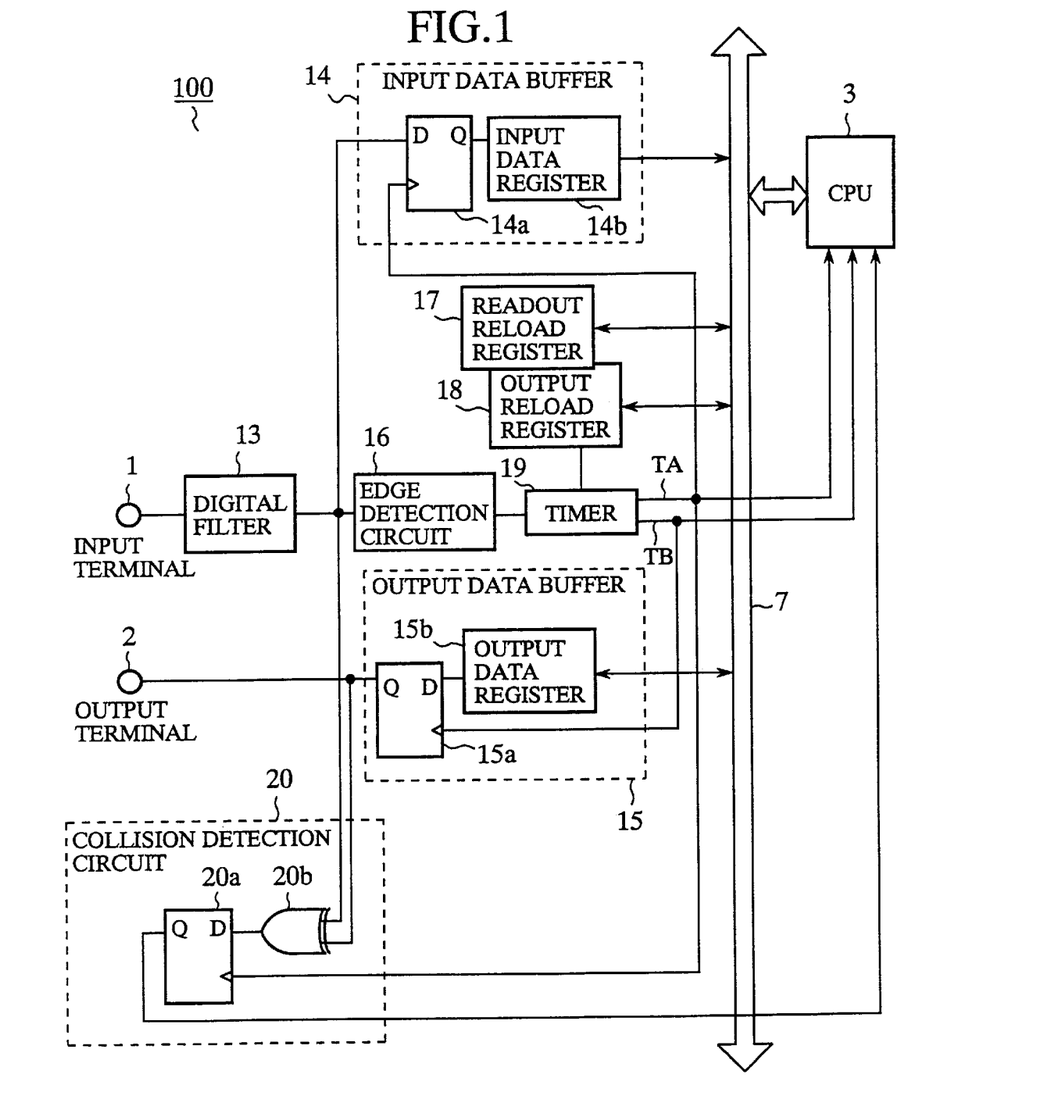
FIG. 1 is a block diagram showing a configuration of the communication control device as the first embodiment according to the present invention.

FIG. 1 is a block diagram showing the configuration of the communication control device as the first embodiment according to the present invention. In FIG. 1, the reference number 100 designates the communication control device of the first embodiment. The reference number 1 designates an input terminal connected to communication channels (omitted from FIG. 1) to which communication data items on those communication channels are transmitted. The reference number 2 designates an output terminal, connected to those communication channels based on a wired OR logic or a wired AND logic, through which communication data items are output to the communication channels. The reference number 3 designates a central processing unit (CPU) for receiving communication data through the input terminal 1 and for generating communication data and for transferring the communication data to the output terminal 2. The reference number 13 indicates a digital filter for filtering the wave form of communication data received through the input terminal 1 in order to shape the wave form of the inputted communication data. The reference number 15 designates an output data buffer for temporarily storing communication data written by the CPU 3 and for outputting the stored communication data to the output terminal 2 under a desired timing. The reference number 14 denotes an input data buffer for temporarily storing the output data from the digital filter 13 and for sampling the wave form of the output data from the digital filter 13 under a desired timing. The reference number 16 designates an edge detection circuit for receiving the output data from the digital filter 13 and for outputting an edge detection signal to a timer 19 when a rising edge or a falling edge of the wave form of the output data from the digital filter 13 is detected. The reference number 17 designates a readout reload register to which a readout count value is set by the CPU 3. The reference number 18 denotes an output reload register to which an output count value is set by the CPU 3. The reference number 19 indicates a timer for reading the count values stored in both the readout reload registers 17 and the output reload register 18 alternately in order to count them, and for outputting a latch signal to the input data buffer 14 when a time out happens based on the count value obtained from the readout reload register 17, and for also outputting a latch signal to the output data buffer 15 when a time out happens based on the output count value obtained from the output reload register 18. The reference number 20 a collision detection circuit for comparing the communication data from the digital filter 13 with the communication data to be output through the output terminal 2, and for generating and outputting a collision detection signal when both communication data items are not equal based on the comparison result. In the timer 19, the edge detection signal is stored. Accordingly, when receiving the edge detection signal transferred from the edge detection circuit 16 during the readout counting operation, the timer 19 reads the readout count value from the readout reload register 17 again, and when receiving the edge detection signal transferred from the edge detection circuit 16 during the output counting operation, the timer 19 outputs a latch signal to the output data buffer 15 and reads the output count value from the output reload register 18 again. Specifically, it is possible to form the timer 19 so that the timer 19 outputs the latch signal based on an overflow generated by counting up operation, or it is also possible to form the timer 19 so that the timer 19 outputs the latch signal based on an underflow obtained by counting down. The reference number 7 designates a bus group including a plurality of buses through which circuit components in the communication control device 100 such as the CPU 3, the input data buffer 14, the output data buffer 15, the readout reload register 17, the output reload register 18, the timer 19, the edge detection circuit 16, the collision detection circuit 20, the input terminal 1, and the output terminal 2, and the like are connected.

The input data buffer 14 comprises an input D flip flop 14a for storing the output transferred from the digital filter 13 according to the latch signal and an input data register 14b for storing the output transferred from the input D flip flop 14a. The output data buffer 15 comprises an output data register 15b for storing the output communication data written by the CPU 3 and an output D flip flop 15a for storing the data stored in the output data register 15b according to the latch signal.

The collision detection circuit 20 comprises an exclusive OR (XOR) circuit 20b and a collision detection D flip flop circuit 20a. The exclusive OR (XOR) circuit 20b inputs both the communication data transferred from the digital filter 13 and the communication data output from the output terminal 2, compares both the communication data items, and outputs a control signal of a high level when both communication data items are different to each other in level. The collision detection D flip flop circuit 20a latches the output from the exclusive OR circuit 20b and outputs the collision detection signal to the CPU 3.

Next, a description will be given of the operation of the communication control device 100 based on the LAN protocol as shown in FIG. 1.

First, the operation of the CPU 3 will be explained.

Figure 2:
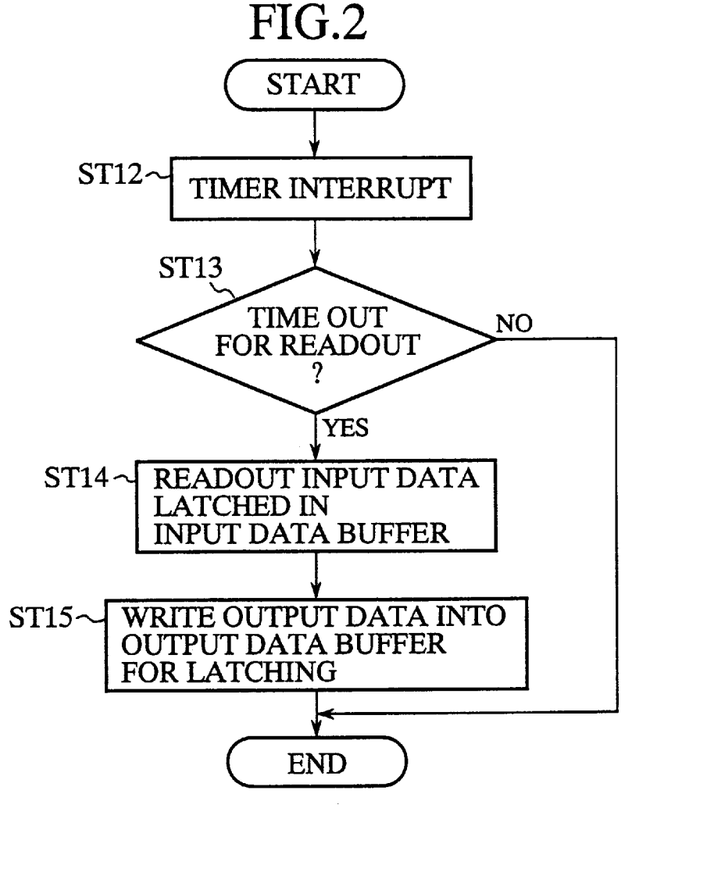
FIG. 2 is a flow chart showing the operation of data transmission and receiving control executed by the communication control device of the first embodiment according to the present invention.

FIG. 2 is a flow chart showing the operation of data transmission and receiving control executed by the communication control device 100 of the first embodiment according to the present invention.

In the flow chart shown in FIG. 2, the step ST12 is a data set waiting step for waiting to receive a timer interrupt that is generated based on the latch signal transferred from the timer 19. The step ST13 is an interrupt detection step for detecting whether the timer interrupt is generated based on the readout count value or not. The step ST14 is a readout step that is executed based on the detection result at the step ST13. That is, the step ST14 is executed only when the timer interrupt is generated based on the readout count value. In the step ST14, input communication data of one bit stored in the input data buffer 13 is read. The step ST15 is a write-in step to set the output communication data of one bit into the output data buffer 15.

At the step ST13, when it is detected that the timer interrupt is not generated based on the readout count value and it is based on the output count value, both the step ST14 and the step ST15 are not executed and the operation flow directly goes from the step ST13 to the end step.

Figure 3:
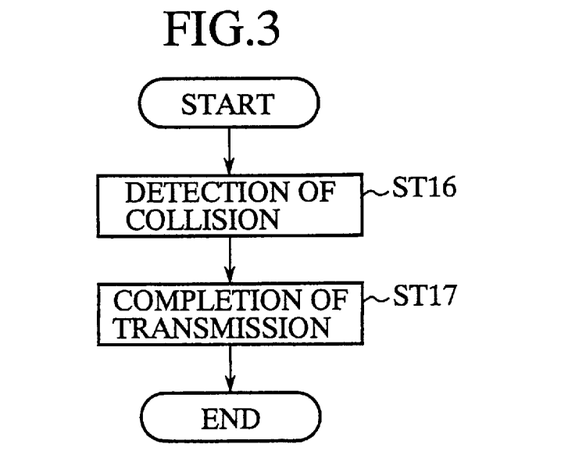
FIG. 3 is a flow chart showing the operation when a collision of data communication data is detected by the communication control device of the first embodiment according to the present invention.

FIG. 3 is a flow chart showing the operation of the CPU 3 when a data collision of data communication data is detected by the communication control device 100 of the first embodiment according to the present invention. In FIG. 3, the step ST16 is a collision detection step to detect the collision detection signal. The step ST17 is a transmission completion step to halt the data writing operation to the output data buffer 15 when the data collision is detected at the step ST16.

Figure 4:
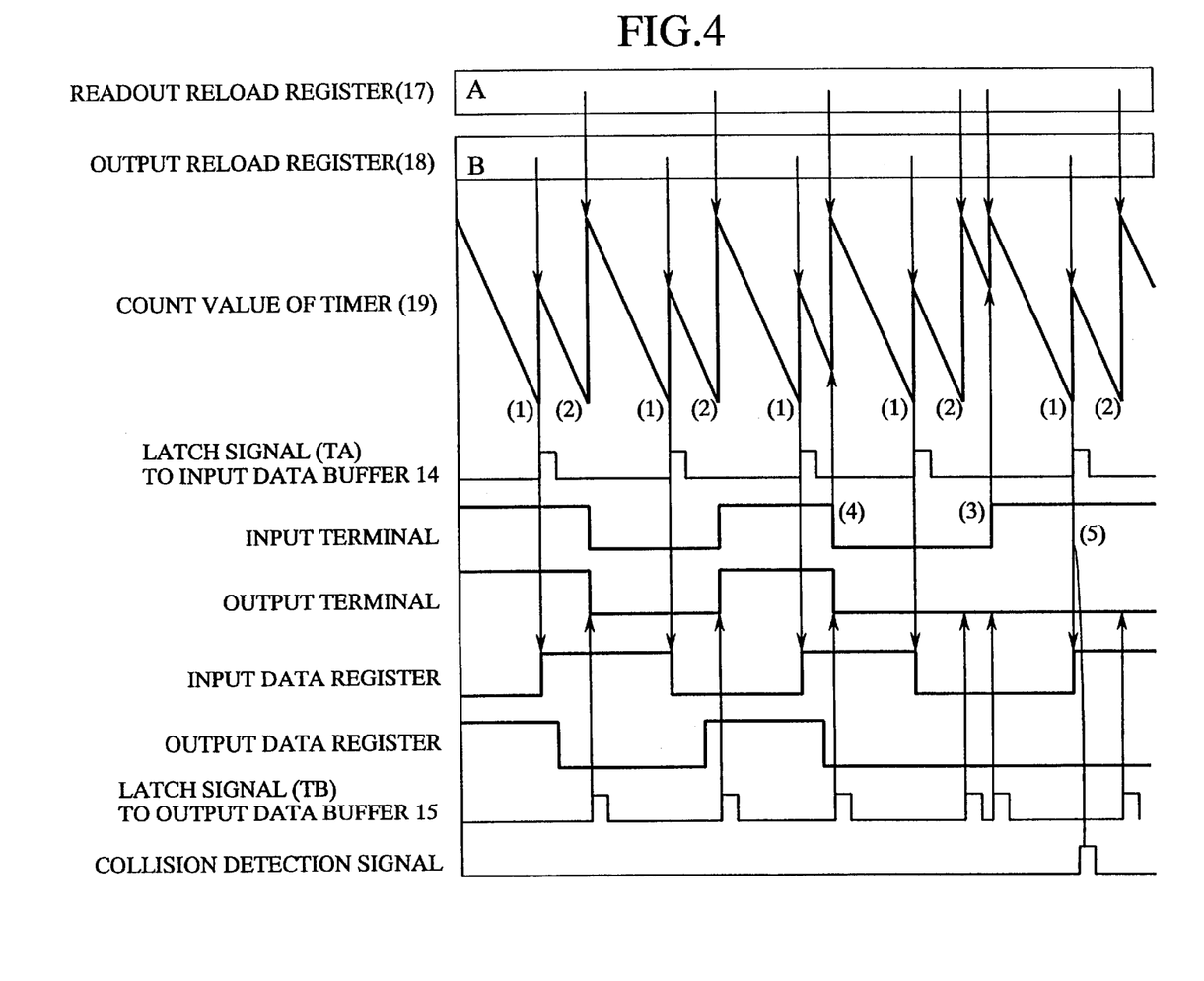
FIG. 4 is an operational diagram showing the entire operation timing of the communication control device as the first embodiment according to the present invention.

FIG. 4 is an operational diagram showing the entire operation timing of the communication control device 100 as the first embodiment according to the present invention. In FIG. 4, the reference character TA designates the latch signal to be transferred from the timer 19 to the input data buffer 14 and the CPU 3 based on the set value (as the readout count value) stored in the readout reload register 17, and the reference character TB denotes the latch signal to be transferred from the timer 19 to the output data buffer 15 and the CPU 3 based on the set value (as the output count value) stored in the output reload register 18.

As shown in FIG. 4, the communication control device 100 of the first embodiment may perform in synchronism with the wave form of the communication data inputted through the input terminal 1. For example, as shown by the reference character (3) in FIG. 4, when both the timing of the communication data obtained through the input terminal 1 and the timing of the time out of the timer 19 are shifted to each other, it is possible to reload the count value of the timer 19 (namely, to read it again) from the readout reload register 17 in order to synchronize both the timings.

Under the synchronization of both the timings, as shown by the reference characters (1) and (2), it is possible to output the communication data stored in the output data register 15b by the latch signal at the desired timing (as the transmitting timing) based on the protocol during one bit cycle and it is also possible to store the input communication data into the input data register 14b by the latch signal at the desired timing (as the receiving point) based on the protocol during the one bit cycle. Furthermore, the CPU 3 may transmit and receive the communication data to both the input data register 14b and the output data register 15b during one bit cycle, as shown in the flow chart shown in FIGS. 2 and 3.

Moreover, when the collision detection signal is received during the output of the communication data through the output terminal 2, it is possible to halt the transmission of following communication data items.

As described above in detail, because the communication control device 100 of the first embodiment has the configuration in which two reload registers, namely, the readout reload register 17 and the output reload register 18 are incorporated and the transmission and receiving timings of communication data are controlled based on the count values stored in both the reload registers 17 and 18, it is possible to output the communication data from the output data buffer 15 and to read the communication data into the input data buffer 14 according to the time out by the timer 19 without any control operations by the CPU 3. The CPU 3 may perform the transmission operation and the receiving operation for the communication data during one bit cycle after the CPU 3 has set the count values corresponding to a required protocol into both the readout reload register 17 and the output reload register 18.

Furthermore, because the communication control device 100 of the first embodiment has the configuration in which the edge detection circuit 16 for detecting the rising edge and the falling edge of the waveform of the input communication data is incorporated and the count value is reloaded based on the detection of the edge of the wave form of the communication data, it is possible to keep the synchronism with other communication control devices connected to the same communication network without any control operations by the CPU 3.

Moreover, because the communication control device 100 of the first embodiment has the configuration in which the collision detection circuit 20 for comparing the input communication data with the output communication data in real timing is incorporated, it is thereby not required for the CPU 3 to compare both the input communication data and the output communication data, so that it is possible to reduce the time length required for one bit cycle based on the non return to zero (NRZ) method while detecting the collision of communication data.

Therefore according to the communication control device of the first embodiment, it is possible to set the transmission point and the receiving point corresponding to each of various kinds of protocols by changing the values (for example, each of the values is a ratio or a sum) stored in both the reload registers 17 and 18. It is thereby possible to widely and easily apply the communication control device of the first embodiment to various applications using various kinds of protocols. In addition, because it is not required to incorporate dedicated hardware circuits only to perform the data transmission and data receiving operation and to detect a collision generated during one bit cycle as operation routines in order to reduce the load of the CPU 3, and because it is not required to adjust the output timing and the readout timing for communication data by the CPU 3, the communication control device of the first embodiment may perform the communication data transmission operation and the communication data receiving operation at a higher speed that is higher than the processing ability of the CPU 3. As a result, it is possible to easily and widely apply the communication control device of the first embodiment to devices in a higher speed communication network field.

Second Embodiment

The communication control device of the second embodiment according to the present invention has an input data register 14b and an output data register 15b, each of which may store a plurality of bit data items and may output those data items according to the first in first out (FIFO) method. Other circuit elements of the communication control device of the second embodiment are the same as those of the communication control device of the first embodiment shown in FIGS. 1 to 4, the explanation of them is therefore omitted here for brevity.

Next, a description will be given of the communication control device of the second embodiment.

The CPU 3 writes and reads a communication data item having a plurality of bit data items to each of the input data register and the output data register every one access operation. Other operations are the same as the operations in the communication control device of the first embodiment.

As described above, according to the communication control device of the second embodiment, the CPU 3 may perform the communication data transmission and receiving operations per plurality of bit data items, so that it is possible to reduce the operation time of the CPU 3 required for the communication data items each having the same amount data size. That is, the communication control device of the second embodiment may perform higher than the communication control device of the first embodiment, and is also applied to further higher communication networks.

As set forth above, according to the present invention, the communication control device includes the readout reload register to which a readout count value is set by the CPU, the output reload register to which an output count value is set by the CPU, and the timer for reading the count values stored in both the readout reload register and the output reload register alternately every an occurrence of a time out and for counting each of the readout count value and the output count value. In addition to this configuration described above, the input data buffer stores the communication data when a time out happens based on the readout count values, and the output data buffer outputs said communication data when a time out happens based on the output count values. Thereby, it is possible to output the communication data from the output data buffer and to read the communication data into the readout data buffer corresponding to the time out generated by the timer without any execution of access operations by the CPU. Accordingly, it is possible to execute the transmission and receiving operations and other control operations required for communication data under the state in which the CPU performs only the input/output operation for the communication data without performing other control operations after the CPU sets count values corresponding to a target protocol into the readout reload register and the output reload register. It is thereby possible to apply the communication control device of the present invention widely and easily to a higher speed communication network field without any decreasing of the general applicability and the performance of the communication control device.

In addition, according to the present invention, the communication control device further comprises the edge detection circuit, located between the input terminal and the timer, for detecting an edge of the wave form of the communication data transferred through the input terminal and for outputting an edge detection signal to the timer. In addition to this, the timer reloads the readout count value from the readout reload register when receiving the edge detection signal transferred from the edge detection circuit during readout counting operation to count a count value based on the readout count value, and the timer outputs a time out and reloads the readout count value from the readout reload register when receiving the edge detection signal transferred from the edge detection circuit during output counting operation to count a count value based on the output count value. Thereby, the CPU may read and write a plurality of communication data items continuously without performing the operation of a synchronous compensation control by the CPU based on the detection of an edge. It is therefore possible to apply the communication control device of the present invention widely and easily to a higher speed communication network field without any decreasing of the general applicability and the performance of the communication control device.

Furthermore, according to the present invention, at least one of the output data buffer and the input data buffer in the communication control device stores a plurality of the communication data items and outputs the plurality of communication data items in order based on the first-in first-out (FIFO) method. It is therefore possible to reduce the processing time length required for the CPU when communication data items each having a same data size are transmitted. Accordingly, it is possible to apply the communication control device of the present invention widely and easily to a higher speed communication network field without any decreasing of the general applicability and the performance of the communication control device.

Moreover, according to the present invention, the communication control device further comprises a collision detection circuit for comparing the communication data from the input terminal with the communication data to be output through the output terminal, and for generating and outputting a collision detection signal to the CPU when both the communication data are not equal to each other, and wherein the CPU stops to output the communication data through the output terminal when receiving the collision detection signal from the collision detection circuit. Thereby, it is not required for the CPU to detect an occurrence of a collision of communication data. Accordingly, it is possible to apply the communication control device of the present invention widely and easily to a higher speed communication network field without any decreasing of the general applicability and the performance of the communication control device.

While the above provides a full and complete disclosure of the preferred embodiments of the present invention, various modifications, alternate constructions and equivalents may be employed without departing from the scope of the invention. Therefore the above description and illustration should not be construed as limiting the scope of the invention, which is defined by the appended claims.

What is claimed is:

1. A communication control device comprising:
   an input terminal connected to communication channels for inputting communication data on said communication channels;
   an output terminal connected to said communication channels through a wired OR logic or a wired AND logic and for outputting communication data to said communication channels;
   a central processing unit for receiving said communication data from said input terminal and for generating said communication data to be transferred to said output terminal;
   an output buffer for storing said communication data written by the central processing unit and for outputting said communication data to said communication channels through said output buffer;
   an input buffer for storing said communication data on said communication channels through said input terminal and said communication data stored by said input buffer being read by said central processing unit;
   a readout reload register to which a readout count value is set by said central processing unit;
   an output reload register to which an output count value is set by said central processing unit; and
   a timer for reading said count values stored in both said readout reload register and said output reload register alternately every an occurrence of a time out, and for counting each of said readout count value and said output count value,
   wherein when said time out is happen based on said readout count values, said input data buffer stores said communication data, and when said time out is happen based on said output count values, said output data buffer outputs said communication data.

2. A communication control device as claimed in claim 1, further comprising an edge detection circuit, located between said input terminal and said timer, for detecting an edge of said communication data transferred through said input terminal and for outputting an edge detection signal to said timer, wherein said timer reloads said readout count value from said readout reload register when inputting said edge detection signal from said edge detection circuit during readout counting operation to count a count value based on said readout count value, and said timer outputs a time out and reloads said readout count value from said readout reload register when inputting said edge detection signal from said edge detection circuit during output counting operation to count a count value based on said output count value.

3. A communication control device as claimed in claim 2, wherein at least one of said output data buffer and said input data buffer stores a plurality of said communication data items and outputs said plurality of communication data items in order based on a first-in first-out method.

4. A communication control device as claimed in claim 3, further comprising a collision detection circuit for comparing said communication data from said input terminal with said communication data to be output through said output terminal, and for generating and outputting a collision detection signal to said central processing unit when both said communication data are not equal to each other, and wherein said central processing unit stops to output said communication data through said output terminal when receiving said collision detection signal from said collision detection circuit.

5. A communication control device as claimed in claim 4, wherein said collision detection circuit comprises an exclusive OR circuit for comparing said communication data from said input terminal with said communication data to be output through said output terminal and for generating and outputting a control signal of a high voltage level when both said communication data are not equal to each other in voltage level, and a collision detection D flip flop for generating and outputting said collision detection signal to said central processing unit when receiving said control signal of a high voltage level from said exclusive OR circuit and when receiving a latch signal transferred to said input data buffer from said timer.

6. A communication control device as claimed in claim 3, wherein said output data buffer comprises an output data register for storing said communication data written by said central processing unit, and an output D flip flop for storing said communication data output from said output data register based on a latch signal provided from said timer.

7. A communication control device as claimed in claim 3, wherein said input data buffer comprises an input D flip flop for storing said communication data obtained through said input terminal based on a latch signal provided from said timer, and an input data register for storing said communication data output from said input D flip flop.

8. A communication control device as claimed in claim 2, further comprising a collision detection circuit for comparing said communication data from said input terminal with said communication data to be output through said output terminal, and for generating and outputting a collision detection signal to said central processing unit when both said communication data are not equal to each other, and wherein said central processing unit stops to output said communication data through said output terminal when receiving said collision detection signal from said collision detection circuit.

9. A communication control device as claimed in claim 8, wherein said collision detection circuit comprises an exclusive OR circuit for comparing said communication data from said input terminal with said communication data to be output through said output terminal and for generating and outputting a control signal of a high voltage level when both said communication data are not equal to each other in voltage level, and a collision detection D flip flop for generating and outputting said collision detection signal to said central processing unit when receiving said control signal of a high voltage level from said exclusive OR circuit and when receiving a latch signal transferred to said input data buffer from said timer.

10. A communication control device as claimed in claim 2, wherein said output data buffer comprises an output data register for storing said communication data written by said central processing unit, and an output D flip flop for storing said communication data output from said output data register based on a latch signal provided from said timer.

11. A communication control device as claimed in claim 2, wherein said input data buffer comprises an input D flip flop for storing said communication data obtained through said input terminal based on a latch signal provided from said timer, and an input data register for storing said communication data output from said input D flip flop.

12. A communication control device as claimed in claim 1, wherein at least one of said output data buffer and said input data buffer stores a plurality of said communication data items and outputs said plurality of communication data items in order based on a first-in first-out method.

13. A communication control device as claimed in claim 12, further comprising a collision detection circuit for comparing said communication data from said input terminal with said communication data to be output through said output terminal, and for generating and outputting a collision detection signal to said central processing unit when both said communication data are not equal to each other, and wherein said central processing unit stops to output said communication data through said output terminal when receiving said collision detection signal from said collision detection circuit.

14. A communication control device as claimed in claim 13, wherein said collision detection circuit comprises an exclusive OR circuit for comparing said communication data from said input terminal with said communication data to be output through said output terminal and for generating and outputting a control signal of a high voltage level when both said communication data are not equal to each other in voltage level, and a collision detection D flip flop for generating and outputting said collision detection signal to said central processing unit when receiving said control signal of a high voltage level from said exclusive OR circuit and when receiving a latch signal transferred to said input data buffer from said timer.

15. A communication control device as claimed in claim 12, wherein said input data buffer comprises an input D flip flop for storing said communication data obtained through said input terminal based on a latch signal provided from said timer, and an input data register for storing said communication data output from said input D flip flop.

16. A communication control device as claimed in claim 12, wherein said output data buffer comprises an output data register for storing said communication data written by said central processing unit, and an output D flip flop for storing said communication data output from said output data register based on a latch signal provided from said timer.

17. A communication control device as claimed in claim 1, further comprising a collision detection circuit for comparing said communication data from said input terminal with said communication data to be output through said output terminal, and for generating and outputting a collision detection signal to said central processing unit when both said communication data are not equal to each other, and wherein said central processing unit stops to output said communication data through said output terminal when receiving said collision detection signal from said collision detection circuit.

18. A communication control device as claimed in claim 17, wherein said collision detection circuit comprises an exclusive OR circuit for comparing said communication data from said input terminal with said communication data to be output through said output terminal and for generating and outputting a control signal of a high voltage level when both said communication data are not equal to each other in voltage level, and a collision detection D flip flop for generating and outputting said collision detection signal to said central processing unit when receiving said control signal of a high voltage level from said exclusive OR circuit and when receiving a latch signal transferred to said input data buffer from said timer.

19. A communication control device as claimed in claim 1, wherein said output data buffer comprises an output data register for storing said communication data written by said central processing unit, and an output D flip flop for storing said communication data output from said output data register based on a latch signal provided from said timer.

20. A communication control device as claimed in claim 1, wherein said input data buffer comprises an input D flip flop for storing said communication data obtained through said input terminal based on a latch signal provided from said timer, and an input data register for storing said communication data output from said input D flip flop.

* * * * *